(12) United States Patent
Thirunarayana et al.

(10) Patent No.: US 10,870,562 B2
(45) Date of Patent: Dec. 22, 2020

(54) SYSTEM AND METHOD FOR HOIST WITH INTEGRATED DRUM AND MOTOR

(71) Applicant: Goodrich Corporation, Charlotte, NC (US)

(72) Inventors: Ashok Kumar Thirunarayana, Karnataka (IN); Adishesha Chinknyakanhalli Sivaramasastry, Karnataka (IN); Subhra Kanti Das, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 173 days.

(21) Appl. No.: 15/873,597

(22) Filed: Jan. 17, 2018

(65) Prior Publication Data
US 2019/0016571 A1   Jan. 17, 2019

(30) Foreign Application Priority Data
Jul. 11, 2017   (IN) .............................. 201741024417

(51) Int. Cl.
*B66D 1/22* (2006.01)
*H02K 7/10* (2006.01)
(Continued)

(52) U.S. Cl.
CPC ................ *B66D 1/22* (2013.01); *B66D 1/12* (2013.01); *H02K 1/16* (2013.01); *H02K 7/1012* (2013.01);
(Continued)

(58) Field of Classification Search
CPC ... B66D 1/12; B66D 1/22; H02K 1/16; H02K 7/1012; H02K 7/1016; H02K 7/116; H02P 6/24; B66B 11/08; B66F 9/205
See application file for complete search history.

(56) References Cited

U.S. PATENT DOCUMENTS 1,937,404 A * 11/1933 Dudick .................. H02K 7/106
                                                    318/744
5,070,290 A * 12/1991 Iwasa ........................ B66B 5/02
                                                    187/288
(Continued)

FOREIGN PATENT DOCUMENTS

CN   101719702 A   6/2010
CN   203486818 U   3/2014
(Continued)

OTHER PUBLICATIONS

European Search Report for Applcation No./Patent No. 18182979.7-1202 dated Nov. 15, 2018; 11 pgs.

*Primary Examiner* — Michael E Gallion
(74) *Attorney, Agent, or Firm* — Cantor Colburn LLP (57) ABSTRACT

Embodiments herein relate to a permanent magnet (PM) motor driven hoist system. The hoist system includes a PM out-runner motor with a stator on a fixed central shaft with stator coils, and an outer rotor assembly coaxial with and rotatable about the stator. The rotor having a rotating housing with an outer surface radially outward of the shaft and an inner surface radially inward of the shaft and plurality of PMs disposed at the inner surface configured to magnetically couple with the stator. The rotating housing coupled to the cable drum such that rotation of the rotor assembly causes rotation of the cable drum. The system also includes a controller connected to a power source and the motor, configured to generate excitation signals applied to the stator coils to induce a torque in the outer rotor assembly and cause it to rotate about the stator and central shaft.

25 Claims, 9 Drawing Sheets (51) Int. Cl.
    *H02P 6/24*           (2006.01)
    *B66D 1/12*           (2006.01)
    *H02K 1/16*           (2006.01)
    *H02K 7/116*          (2006.01)

(52) U.S. Cl.
    CPC ........... *H02K 7/1016* (2013.01); *H02K 7/116* (2013.01); *H02P 6/24* (2013.01)

(56) References Cited

U.S. PATENT DOCUMENTS

| | | | | |
|---|---|---|---|---|
| 6,328,136 | B1* | 12/2001 | Tauchi | B66B 1/3492 |
| | | | | 187/391 |
| 8,985,555 | B2* | 3/2015 | Cryer | B66D 1/22 |
| | | | | 254/290 |
| 2008/0116432 | A1* | 5/2008 | Folk | B66D 1/12 |
| | | | | 254/362 |
| 2010/0127229 | A1* | 5/2010 | Kverneland | E21B 19/008 |
| | | | | 254/356 |
| 2013/0334996 | A1* | 12/2013 | Nishikawa | B66D 3/18 |
| | | | | 318/430 |
| 2017/0008743 | A1* | 1/2017 | Hooymans | B66D 1/12 |
| 2018/0215592 | A1* | 8/2018 | Thirunarayana | B66D 1/12 |

FOREIGN PATENT DOCUMENTS

| | | |
|---|---|---|
| CN | 104817026 A | 8/2015 |
| EP | 2174411 A1 | 4/2010 |
| WO | 2009013388 A1 | 1/2009 |

\* cited by examiner

FRONT VIEW

SYSTEM AND METHOD FOR HOIST WITH INTEGRATED DRUM AND MOTOR

CROSS-REFERENCE TO RELATED APPLICATIONS

This application claims the benefit of IN Application No. 201741024417 filed Jul. 11, 2017, which is incorporated herein by reference in its entirety.

TECHNICAL FIELD

The invention relates to an integrated gear winch/hoist driven by an external rotor permanent magnet motor and braking schemes for electrically operated hoists, in particular, rescue hoists employing permanent magnet (PM) motors.

BACKGROUND

Helicopter rescue hoists are used for search and rescue operations of people under emergency situations, for example, evacuation from fire, mid sea, crevasses, land mass, mines and so on in natural calamities or other human operational scenarios. In such situations, the hoist control for reel-in/reel-out modes needs to be very accurate and reliable, to ensure that a person being rescued is not injured or that a payload is not damaged. The reliable usage of an electrically powered hoist may be dependent on the efficiency and reliability of the hoist motor, gear train, and braking systems. The architecture used in the conventional hoist configurations commonly includes a brush or brushless direct current (BLDC) motors. The motor shaft runs through the entire driveline and is connected to a co-axial cable drum through a sequence of several stages of gears in a gear train. The gear train help in transmitting power from motor end to the cable drum and moving the cable at an acceptable speed. The gear train is commonly a set of spur gears at one end of the motor shaft to provide torque to turn the drum. Spur gears, while adequate for many applications, are subject to losses from meshing and generate noise. Moreover, because the load is applied to an extended end of the motor shaft, it produces a cantilever effect on the bearings, which leads to bending mode frequency components triggering vibrational effects and exacerbating wear and tear, and noise. Further, such a configuration is asymmetric and, as such, would be complicated to maintain mass-torque balance.

A braking mechanism holds the hoist in a fixed position when the motor driving it is not powered. During such operations of a hoist, there could be chances of jerking the payload or even free fall should the braking mechanism become inoperative. In conventional hoist operation, brake function is provided through separate electromechanical means. Some hoist systems have even been equipped with two independent brakes, one of which is known as mechanical load brake and the other a spring set, electrically releasable, friction brake generally referred to as holding brake. A mechanical load brake is a device wherein friction surfaces are brought into engagement by means of torque derived from the suspended load in a manner to retard and stop the descent of said load. The frictional surfaces tend to be released from engagement by torque from the motor in the lowering direction. However, if the motor torque is then removed such as through a power supply failure, the brake would stop and hold the load. The load brake is typically disengaged during hoisting by a clutching mechanism. In operation, each of these brake types are designed to stop and hold any load within the capacity of the hoist. However, use of load and holding brakes is more complex and requires additional weight. The additional weight, in an aircraft application, is undesirable.

While it has long been recognized that a braking system that was effective in the event of power failure was a highly desirable feature, several types of hoists have omitted using a mechanical load brake and relied on other schemes for braking when needed. One approach that has been employed is to use electromagnetic motor braking as the second braking means. The phenomenon of electromagnetic braking is a well-known characteristic of motors controlled to operate like a generator, yet also can provide a braking torque. On hoists powered from a direct current source, it is quite simple to connect the direct current drive motor such that it becomes a self-excited generator and, thus, provides the second source of braking in the absence of external power. However, electromagnetic braking in any form, depends on rotation to develop torque, and as such, would not always hold a load stationary. Therefore, it would be desirable to have an alternative means of providing braking for the hoist that takes advantage of electromagnetically braking of the hoist motor, resulting in faster and more accurately controlled stopping action, particularly should a conventional electromechanical brake not be employed.

BRIEF DESCRIPTION

Embodiments herein relate to a permanent magnet (PM) motor driven hoist system. The hoist system includes a PM out-runner motor with a stator on a fixed central shaft with stator coils, and an outer rotor assembly coaxial with and rotatable about the stator. The rotor having a rotating housing with an outer surface radially outward of the shaft and an inner surface radially inward of the shaft and plurality of PMs disposed at the inner surface configured to magnetically couple with the stator. The rotating housing coupled to the cable drum such that rotation of the rotor assembly causes rotation of the cable drum. The system also includes a controller connected to a power source and the motor, configured to generate excitation signals applied to the stator coils to induce a torque in the outer rotor assembly and cause it to rotate about the stator and central shaft.

In addition to one or more of the features described above, or as an alternative, further embodiments may include that the rotating housing is at least one of directly mounted to, disposed on, integral with, and is the same as the cable drum.

In addition to one or more of the features described above, or as an alternative, further embodiments may include a first gear train operably coupled between the PM motor rotor assembly and the cable drum.

In addition to one or more of the features described above, or as an alternative, further embodiments may include that the first gear train is a planetary gear train with a sun gear operably coupled between the rotating housing and a ring gear operably coupled to the cable drum.

In addition to one or more of the features described above, or as an alternative, further embodiments may include that the sun gear is at least one of directly mounted to, disposed on, integral with, and the same as the rotating housing and the ring gear directly mounted to, disposed on, integral with, and the same as the cable drum.

In addition to one or more of the features described above, or as an alternative, further embodiments may include that the planetary gear train includes at least two planet gears interconnected by a fixed carrier.

In addition to one or more of the features described above, or as an alternative, further embodiments may include a second gear train operably coupled between the PM motor rotor assembly and the cable drum.

In addition to one or more of the features described above, or as an alternative, further embodiments may include that the first gear train and the second gear train are axially symmetric with respect to a load applied at an axial center of the cable drum.

In addition to one or more of the features described above, or as an alternative, further embodiments may include that the PM out-runner motor is at least one of a brushless direct current motor, a PM synchronous motor, and a reluctance motor.

In addition to one or more of the features described above, or as an alternative, further embodiments may include that the stator assembly includes a plurality of stator teeth, and the stator coils are at least one of concentric on a single tooth and distributed about a plurality of stator teeth.

In addition to one or more of the features described above, or as an alternative, further embodiments may include that the stator is formed of at least one of steel laminations, sintered magnetic powder material, and solid ferromagnetic material.

In addition to one or more of the features described above, or as an alternative, further embodiments may include that the PMs are of arcuate in shape and axial cross section and rectangular in radial cross section, having longer sides radially outward and proximate to the rotating housing.

In addition to one or more of the features described above, or as an alternative, further embodiments may include that the PMs are composed of at least one of alnico, neodymium, samarium cobalt and ceramic.

In addition to one or more of the features described above, or as an alternative, further embodiments may include that the rotating housing is ferromagnetic.

In addition to one or more of the features described above, or as an alternative, further embodiments may include a plurality of Hall effect sensors configured to detect the position of a rotor of the PM out-runner motor.

In addition to one or more of the features described above, or as an alternative, further embodiments may include that the controller includes an inverter for generating the excitation signals to the PM out-runner motor, the inverter having at least six switching devices arranged in three legs.

In addition to one or more of the features described above, or as an alternative, further embodiments may include that the excitation signals are pulse width modulated (PWM) based on an operational characteristic of the PM out-runner motor.

In addition to one or more of the features described above, or as an alternative, further embodiments may include that the controller is configured to control the PM out-runner motor employing a method to brake the PM out-runner motor. The method including generating control signals in the controller based on a position of the PM out-runner motor, applying a braking command signal to the PM out-runner motor to magnetically lock the PM rotor of the PM out-runner motor for a selected duration, removing the braking command signals for a second selected duration, and repeating the generating control signals, applying a braking command signal and removing the braking command signal until the PM oput-runner motor has stopped.

In addition to one or more of the features described above, or as an alternative, further embodiments may include that the braking command signals are configurable for a given hoist configuration.

In addition to one or more of the features described above, or as an alternative, further embodiments may include an electromechanical brake operably coupled to the controller and the cable drum.

Also described herein in an embodiment is a method of controlling a permanent magnet (PM) out runner motor operably connected to a cable drum with a cable wrapped thereon, a controller operably connected the PM out-runner motor and a power source, the controller executing a method including generating control signals in the controller based on a position of the PM out-runner motor, and applying a braking command signals to the PM out-runner motor to magnetically lock the PM motor for a selected duration, removing the braking command signals for a second selected duration. The method also includes repeating the generating, applying and removing steps until the PM out-runner motor has stopped.

In addition to one or more of the features described above, or as an alternative, further embodiments may include energizing an electromechanical brake when the PM out-runner motor is not commanded to move by the controller, wherein the electromechanical brake is configured to arrest the motion of the cable drum and hold the cable drum in a fixed position under selected conditions.

In addition to one or more of the features described above, or as an alternative, further embodiments may include energizing an electromechanical brake when the PM out-runner motor is commanded to move by the controller, wherein the electromechanical brake is configured to arrest the motion of the cable drum and hold the cable drum in a fixed position under selected conditions.

In addition to one or more of the features described above, or as an alternative, further embodiments may include that the braking command signals are pulse width modulated (PWM) based on an operational characteristic of the PM out-runner motor.

In addition to one or more of the features described above, or as an alternative, further embodiments may include that the braking command signals are configurable for a given hoist configuration.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

In general, embodiments herein relate generally to an aircraft rescue hoist system, and more particularly to a permanent magnet (PM) motor driven hoist with an out runner motor with integral gearing and electromagnetic braking. The hoist includes a power source, a PM motor having inner stator coils on a fixed central shaft and an outer PM rotor configured as a sun gear in a planetary gear set. The ring gear of the planetary gear set is provided on a radially inward surface of a cable drum with a cable wrapped thereon. The hoist system also includes a controller operably connected to the power source and the PM motor. Moreover, in some embodiments the controller is configured to control the PM motor employing a method to electromagnetically brake the PM motor.

Figure 1A:
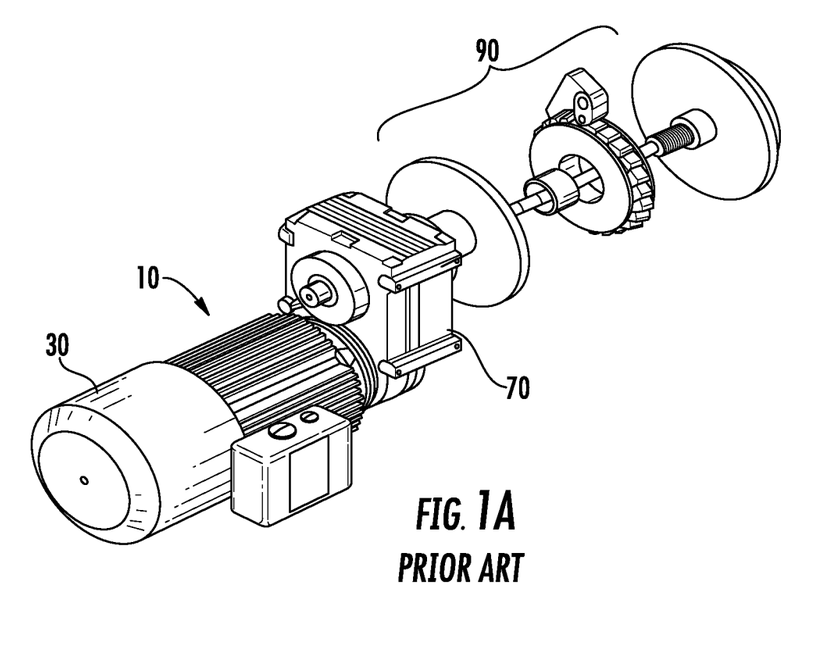
FIG. 1A illustrates a conventional rescue hoist system.
Figure 1B:
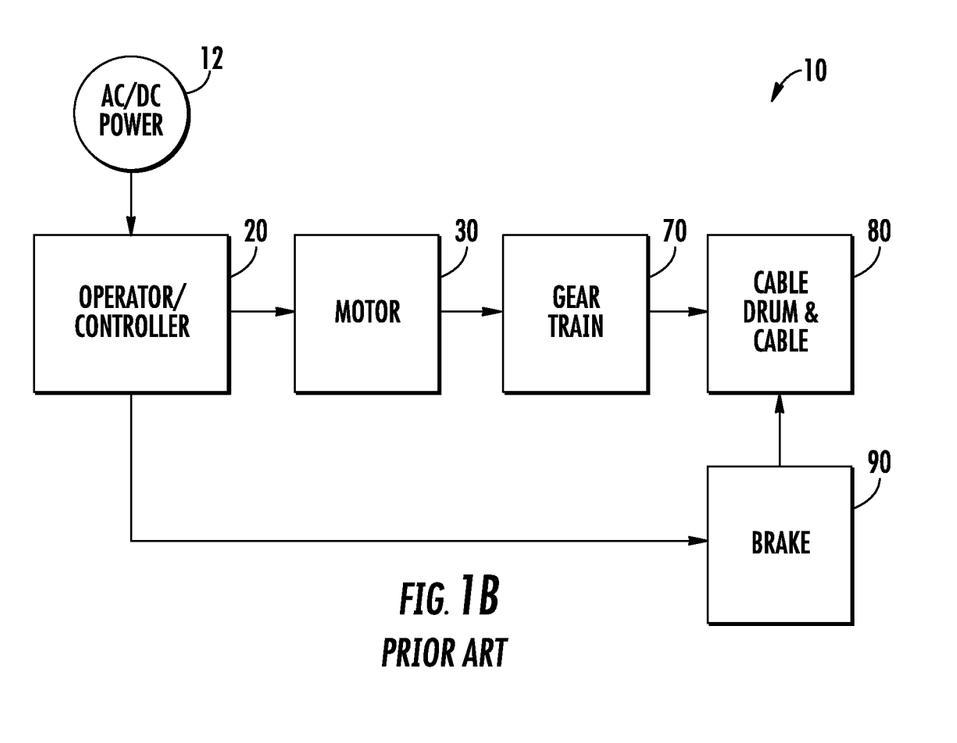
FIG. 1B illustrates a block diagram of a conventional rescue hoist system.

FIG. 1A illustrates a perspective depiction of a conventional rescue hoist system 10. FIG. 1B illustrates a block diagram of a conventional rescue hoist system 10. In normal operation, an operator by way of a controller 20 applies power 12 to a motor 30. The motor 30 drives a gear train 70, which is used to spin the drum 80 with a cable wound thereon for reeling in/out operations. Application of a brake 90 ensures that a hoist payload is maintained in a fixed position when the motor 30 is not energized.

Figure 2:
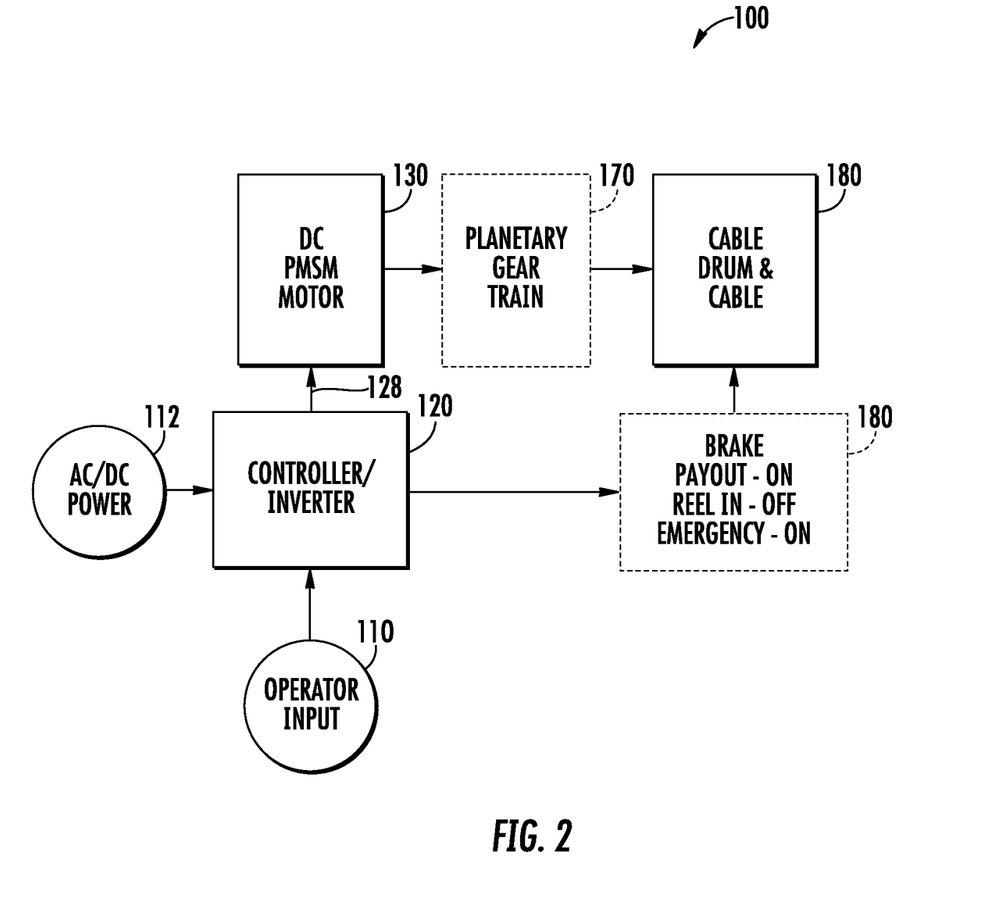
FIG. 2 illustrates a block diagram of the rescue hoist system in accordance with an embodiment.

FIG. 2 illustrates a block diagram of the rescue hoist system 100 in accordance with an embodiment. In normal operation, an operator makes an input 110 command and a controller 120 applies a set of command signals 128 to a PM motor 130. In an embodiment, a PM motor is employed. In other embodiments the PM motor 130 may be a Brushless DC (BLDC) motor, a Permanent Magnet Synchronous Motor (PMSM) or Reluctance motors are employed. In an embodiment, the motor 130 is integrated with and drives a pair of planetary gear train sets 170, which are used to spin the cable drum 180 holding a spool of cable for reeling in/out operations. In some embodiments, a single planetary gear train 170 may be employed. In other embodiments, the gear train 170 may be eliminated and the motor 130, configured as an out runner motor, directly drives the drum 180. In some embodiments, an optional brake 190 ensures that the cable drum 180 and thereby the hoist payload is maintained in a fixed position under certain operating conditions. For example, in an embodiment the optional brake 190 ensures that the hoist system 100 does not freely move when the motor 130 is not energized. In an embodiment, the optional brake 190 is electromechanical and applied based on a control signal from the controller 120 such that the cable payload does not move or fall freely. In other embodiments, the brake 190 is not employed and the braking is provided by the motor 130 using electromagnetic braking such as regenerative or plugging type braking. Moreover, in other embodiments, the braking is provided by both the motor 130 and the optional brake 190 as desired.

Figure 3:
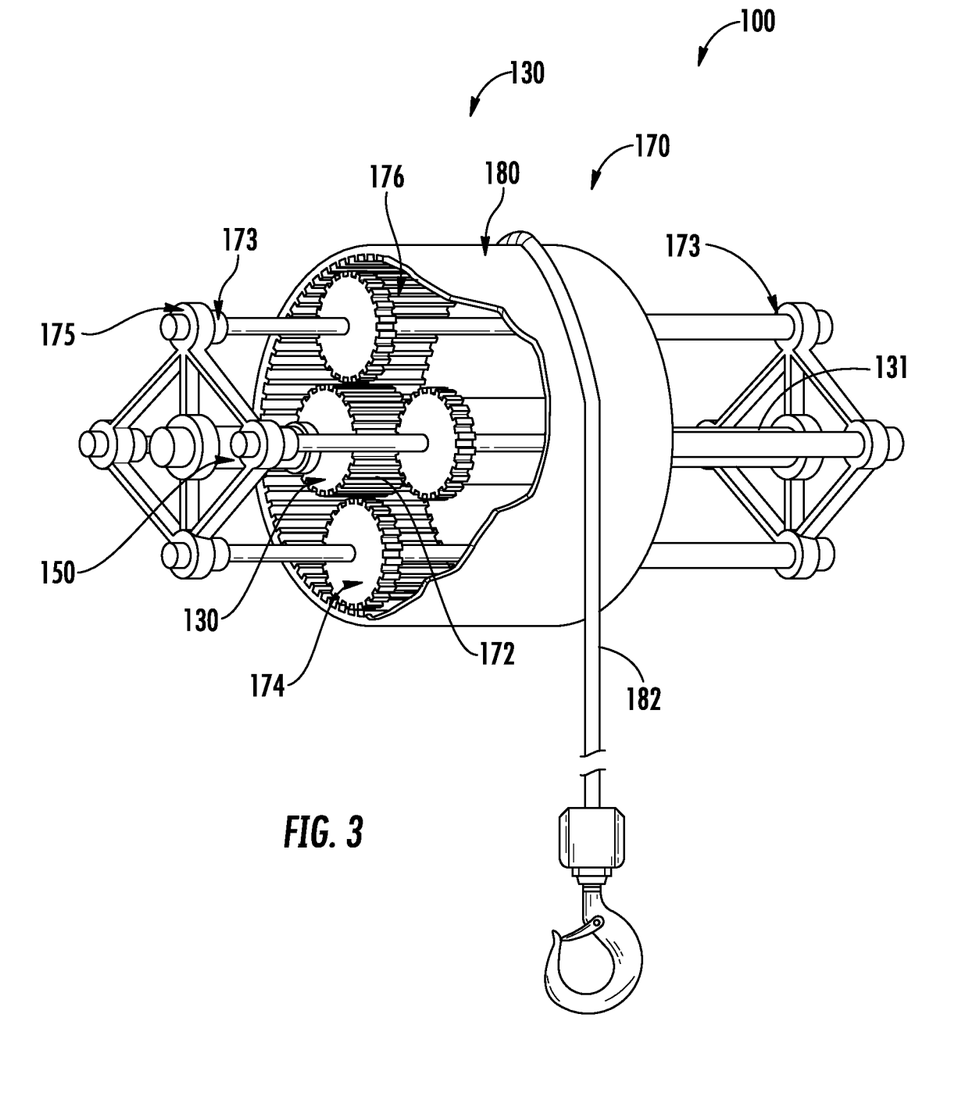
FIG. 3 illustrates a depiction of the rescue hoist system according to an embodiment.
Figure 4:
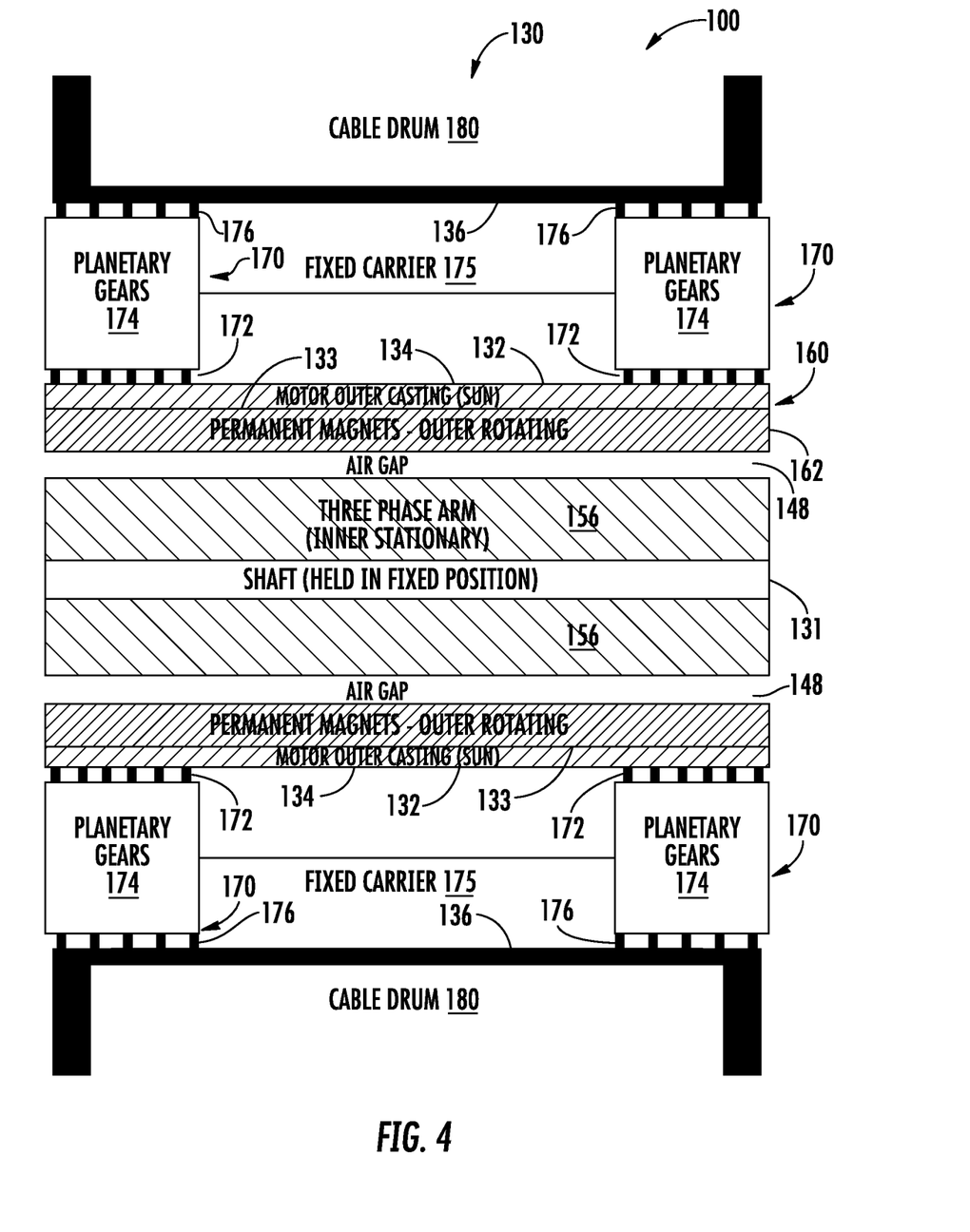
FIG. 4 illustrates a simplified diametrical cross section portion of the rescue hoist system according to an embodiment.
Figure 5:
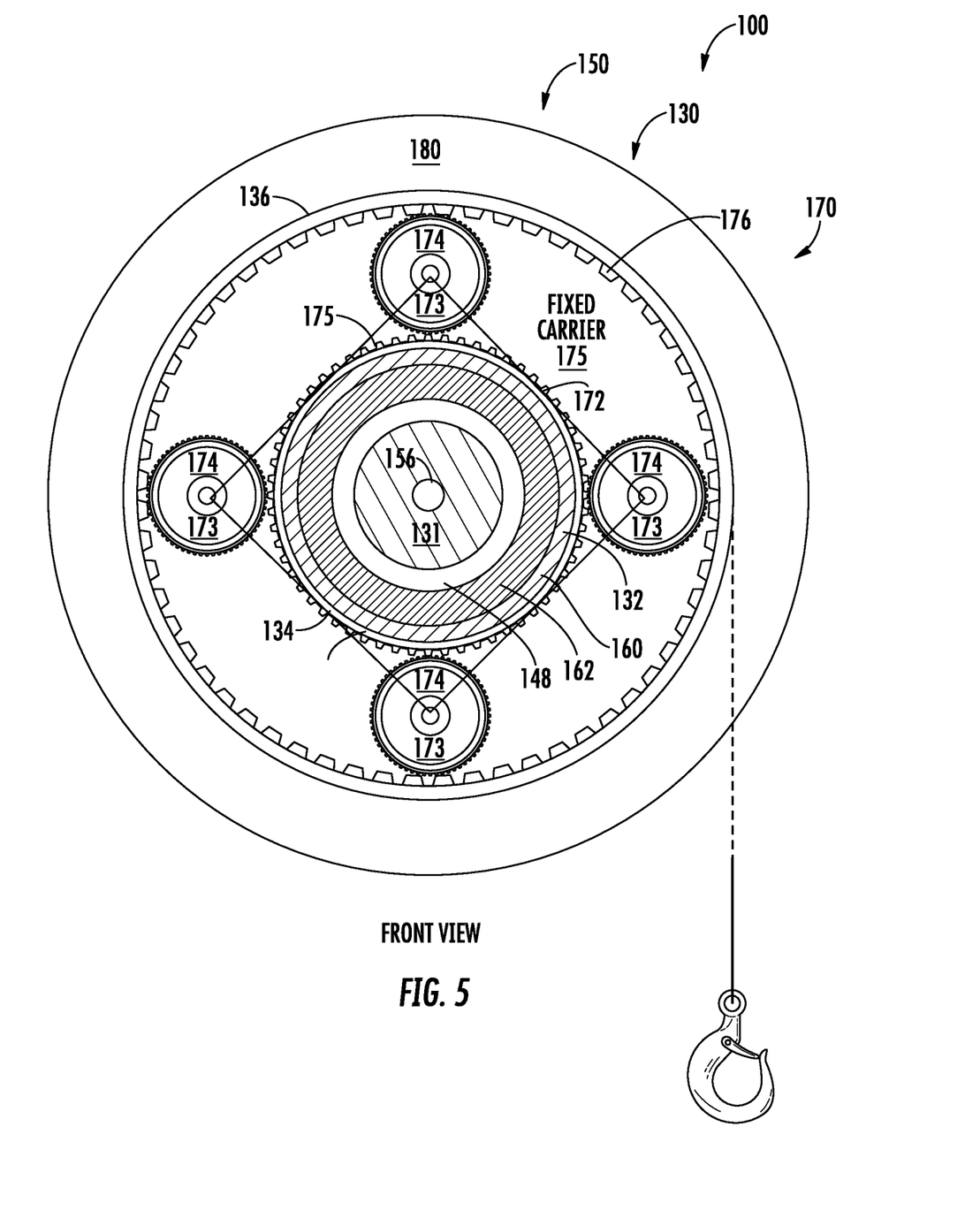
FIG. 5 illustrates a simplified axial cross section portion of the rescue hoist system according to an embodiment.

Referring now to FIGS. 3-6 as well, a hoist system 100 with an out-runner PM motor 130 with integral gearing 170 and electromagnetic braking is depicted. FIG. 3 illustrates a simplified perspective view of the hoist assembly of the hoist system 100 of an embodiment. FIG. 4 illustrates a simplified diametrical sectional view taken axially through the central shaft 131 of the rescue hoist system 100 in accordance with an embodiment. Furthermore, FIG. 5 illustrates a simplified radial cross sectional portion of the rescue hoist system 100 according to an embodiment. In an embodiment, the PM motor 130 is an out-runner motor having inner stator coils 156 on or connected to a fixed central shaft 131 and an outer PM rotor assembly 160. The PM rotor assembly 160 includes a rotating housing 132 that holds the permanent magnets (PMs) 162. In an embodiment the circumferential periphery of the motor housing 132 is driven by the PMs 162 of the motor 130. The motor housing 132 also includes gear teeth to operate as the sun gears 172 of the pair of planetary gear sets 170. In another embodiment, the motor housing 132 and cable drum 180 are the same and the planetary gear train 170 may be eliminated. This may be particularly useful for high-speed applications or applications where power considerations are less important and/or other schemes for speed control are implemented. As illustrated, the ring gear 174 of the planetary gear set 170 is provided on a radially inward surface of a cable drum 180 with a cable 182 (see FIG. 5) wrapped thereon as will be described in further detail below. In an embodiment, the planetary gear set 170 and arrangement is used instead of multiple spur gears as employed in conventional systems. In another embodiment, the out runner motor 130, has the provision for mounting the cable drum 180 directly on the outer rotor assembly 160 and rotating motor housing 132.

In the hoist system 100 and architecture of an embodiment, an out runner PM Synchronous Motor (PMSM) 130 is employed over conventional brush or BLDC motors. The PMs 162 and the stator windings 156 are interchanged such that the PMs 162 surround the armature/stator coils 156. The PMSM 130 is constructed such that the housing 132 with shaft 131 holds the Armature/stator coils 156 rigidly and fixed. The rotor assembly 160 is mounted such that it is permitted to rotate with the PMs 162 concentrically with the shaft 131 and stator 156. In an embodiment a housing 132 with bearings 173 facilitates rotation of the outer rotor assembly 160 and PMs 162.

Figure 6:
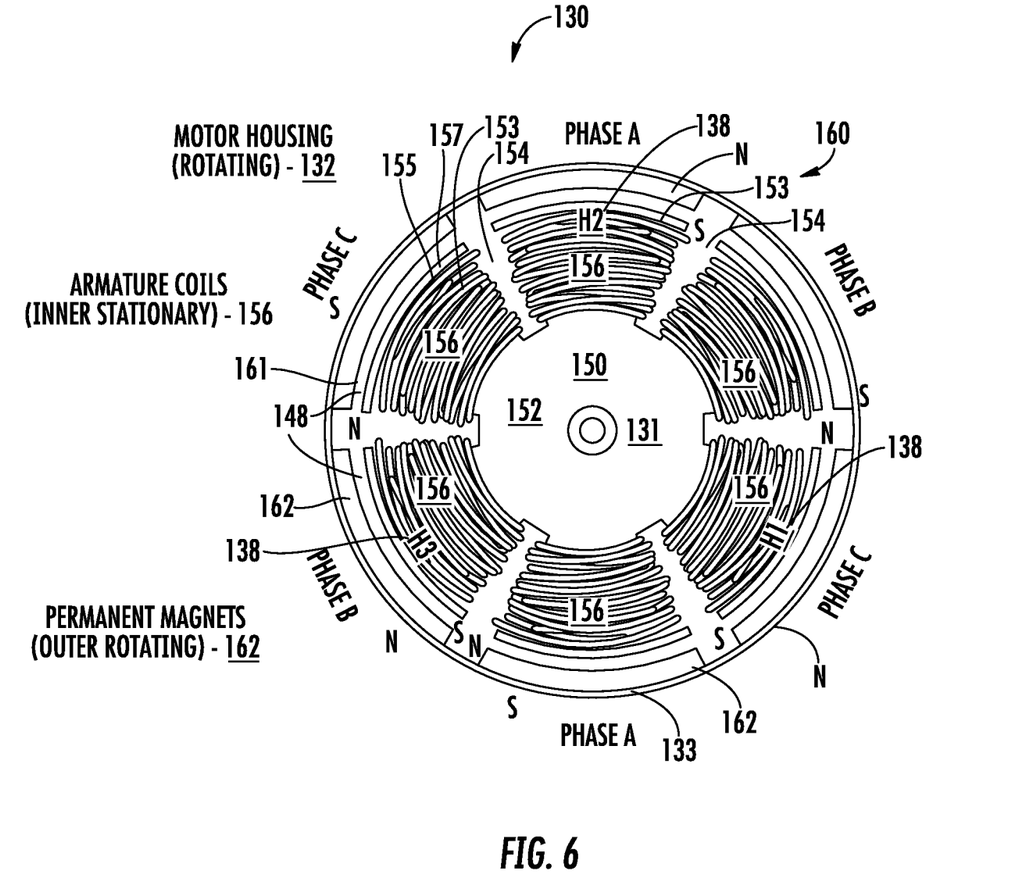
FIG. 6 illustrates a simplified axial cross section of the out runner motor in accordance with an embodiment.

Turning now to FIG. 6 a radial cross section of the motor 130 as a PMSM in an out runner configuration is depicted. The PM machine 100 includes an inner stator assembly 150 disposed on a fixed central shaft 131 with a ferromagnetic stator core 152 and multiple ferromagnetic teeth 153 with slots 154 disposed on the ferromagnetic stator core 152 and three-phase (or polyphase) armature windings (power windings) 156 wound about the stator teeth 153 in the stator slots 154. The windings 156 can be concentrated on a single tooth 153 or distributed over a plurality of teeth 153. A distal end 155 of each stator tooth 153 forming an outer periphery 157 of the stator assembly 150 is proximate an inner annular periphery 161 of the rotor assembly 160. In one embodiment, a small air gap 148 exists between the outer periphery 157 of the stator teeth 153 of the stator assembly 150 and the inner periphery 161 of the PMs 162 of the rotor assembly 160. In an embodiment, the ferromagnetic stator core 152 and stator teeth 153 may be constructed of any variety of ferromagnetic materials including, but not limited to steel laminations, sintered magnetic powder material, or solid ferromagnetic material such a steel. In one embodiment, steel laminations are employed. The stator winding 156, also called an armature winding, is typically a three-phase winding. However, it should be understood that any number of phases may be designed. The minimum number of phases is one.

The outer rotor assembly 160 circumscribes the fixed stator assembly 150 and includes a substantially hollow cylindrical rotating housing 132 and PMs 162 coupled to bearings (not shown) rotatably connected to the fixed central shaft 131. The PM rotor assembly 160 includes multiple PMs 162 arranged and mounted about an inner periphery 133 of the rotating housing 132 and are magnetized in the radial direction. The polarity of PMs 162 is also shown in FIG. 6. By way of example only, FIG. 6 shows the PM rotor assembly 160 with six PMs 162, though other quantities are possible. In one embodiment, the PMs 162 are arcuate in shape and axial cross section and rectangular in radial cross section, having longer sides radially outward and proximate to the rotating housing 132. It will be appreciated, that if desired the PMs 162 can have different cross sections than rectangular and annular. Other shapes such as flat magnets radial magnets could be employed in one or more embodiments. In an embodiment, the PMs 162 may include permanent magnets made with alnico neodymium, samarium cobalt, ceramic and the like.

Advantageously because of the construction of the out runner motor 130 with outer rotor assembly 160 and outer PMs 162, the PM's 162 direct their flux to the stator teeth 153 and there is no need for a ferromagnetic core material for the rotor assembly 160. Thus, if desired, the outer rotating housing 132 can be made of any ferromagnetic material suitable for forming the outer rotating housing 132 and capable of supporting the PMs 162. The rotor assembly 160 depicted has six poles created by PMs 162, though other numbers are possible. The number of PMs 162 is typically even to create pole pairs. The minimum number of PMs 162 is two and the maximum number depends on the design of the rotor assembly 160, the size of the PMs 162 employed, and the room available. Moreover, for those skilled in electrical machines should be apparent that any even number of poles may be used. Also, PMs 162 can be arranged radially (spoke magnets), embedded in axial slots if desired, or other shapes and magnetizations of PMs 162 may be used. In an embodiment, the rotor assembly 160 and housing 132 may be constructed of any variety of materials including, but not limited to steel laminations, sintered magnetic powder material, or solid ferromagnetic material such a steel. In one embodiment, steel laminations are employed.

One advantage of the out-runner PMSM 130 is speed and durability. In conventional PM motors, retention of the PMs 162 in the rotor assembly 160 can be difficult and present design challenges. Some designs require retention clips and bands and other structure to retain the permanent magnets 162 against centrifugal forces. These forces increase dramatically as speeds increase. The out-runner motor 130 design eliminates this problem because the PMs 162 are retained against rotational forces by the rotating housing 132. The housing 132 need only be stiff enough to retain the PM's 162 and to address any further requirements of the motor and hoist design. Moreover, with the PMs 162 place on the outer rotating housing, they can generally be larger and of larger circumference then would otherwise be possible with a conventional inner rotor motor configuration. The relatively larger PMs 162 provide for increased magnetic flux and thereby increased torque and speed capabilities.

Continuing now with FIGS. 3-6, and in particular FIGS. 4 & 5 for description of the planetary gear sets 170. In an embodiment, the planetary gear sets 170 include a sun gear 172 disposed on, or integral with, at least a portion of the outer periphery 134 of the rotating housing 132. The planet gears 174 are driven by the sun gear 172. The ring gear 176 is an internal gear disposed on, or integral with, the inner periphery 136 of the cable drum 180. The planet gears 174 transmit the mechanical power from the sun gear 172 to the ring gear 176. The rotation of the ring gear 176, likewise, rotates the cable drum 180. In an embodiment, the planetary gear train 170 may include a fixed carrier 175. A fixed carrier 175 links the planet gears 174 together and permits bidirectional rotation with improved efficiency for a planetary gear train 170. With a fixed carrier 175, the planet gears 174 are rigidly linked and fixed to a non-rotating portion of the gear train 170 and a non-rotating part of the out-runner motor 130 e.g., the fixed central shaft 131. The planet gears 174 rotate about bearings or pivot points 173 on the carrier 175. In an embodiment at least two planet gears 174 are employed for each to the planetary gear sets. In other embodiments three or more planet gears 174 may be employed with each planetary gear set 170. Employing additional planet gears improves load and power transmission capabilities of the planetary gear set, however additional gear meshes can impact overall geartrain efficiency. As is well understood in the art, with a spur gear arrangement of a conventional hoist, multiple gear reductions are required to achieve the desired speed capability for the hoist system 10. In addition, each gear mesh carries the full load of the hoist system. Advantageously, in the planetary gear set 170 of an embodiment, the full load of the hoist system is divided over several gear meshes at the same time. This reduces wear and loading in the gear train 170 and thereby, improves efficiency.

Continuing with reference to FIGS. 4 & 5, in an embodiment, two planetary gear sets 170 are employed at substantially the longitudinal ends of the out-runner motor 130 and central shaft 131. The advantages of this configuration over the conventional configurations are improved bearing loading, wear and life. In addition as discussed herein, this configuration significantly reduces any cantilever effect on the motor 130 and machine. Moreover eliminating the cantilever effect and providing the more symmetrical loading provides improved torque-mass balance for the hoist apparatus 100. In conventional hoist systems the gear train, load and drum are commonly at one end of the motor, therefore the load produces a cantilever effect on the bearings of the motor 30 and gear train 70. This cantilever effect leads to unbalanced forces and bending mode frequency components triggering vibrational effects and exacerbating wear and tear, noise, and vibration. The described embodiments with the integral out-runner motor 130 and planetary gear train 170 place the load from the drum 180 between two load bearing points permitting more balanced support and significantly reduced cantilever effect. In another embodiment, the two planetary gear sets 170 are axially symmetric with respect to a load applied at an axial center of the cable drum 180, i.e., not necessarily placed at the ends of the shaft 131 or the out-runner motor 130. In other embodiments, the two planetary gear sets 170 may not be symmetrical. Advantageously this configuration provides better mass-torque balance than conventional hoist configurations and reduces load induced vibrations. Reduced load imbalance and vibration reduces wear and tear and extends the operating life of components and the hoist system 100. It should be appreciated that while the described embodiments have been described with respect to employing two planetary gear sets 170, substantially at the longitudinal ends of the out-runner motor 130, other configurations are possible. For example, a single planetary gear set, perhaps elongated, might be employed and located more centrally along the longitudinal axis of the out-runner motor 130. In another example, a third planetary gear train 170 could be employed between the two described above, which would be adept to high load applications. In general, in the embodiments described herein, the use of a planetary gear set 170 eliminates the extended rotor shaft of the conventional designs, and thereby improving torque-mass balance of the hoist apparatus 100. Moreover, the single gear stage for the planetary gear set reduces gear meshes and there by improves efficiency.

In another embodiment, with the use of a high torque lower speed motor is also possible to eliminate the planetary gear train 170 and drive the drum 180 directly from the rotating housing 132 of the rotor assembly 160. In such an embodiment, the inner periphery 136 of the cable drum 180 is directly mounted to, disposed on, integral with, or is the same as, the rotating motor housing 132. In such an embodiment, Since all the components are placed in the closer vicinity it may be desirable to employ a forced air cooling scheme, for example by a fan operably connected to the rotor assembly 160 of the motor 130. In the present architecture the cable drum 180 does not translate, hence a conventional guiding fair lead will facilitate uniform wrap of the cable on to the cable drum 180.

Figure 7:
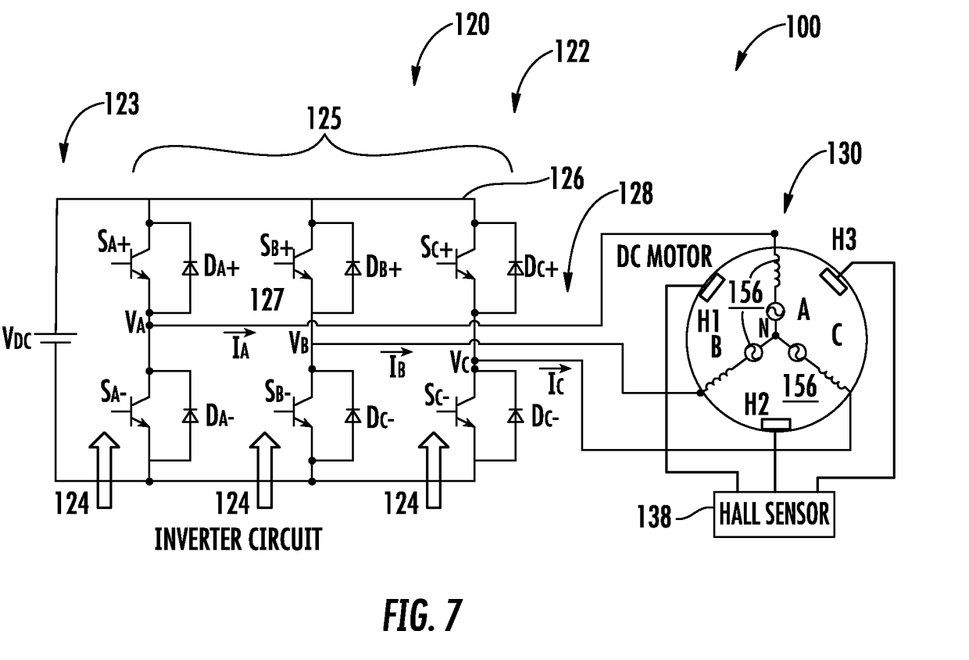
FIG. 7 is a block diagram of the controller and motor drive in accordance with an embodiment.

Referring now to FIG. 7 as well, the controller 120 includes a motor drive 122. In an embodiment, the motor drive 122 includes a direct current (DC) power supply 123 and an inverter 125, each connected to a DC bus 126. The inverter 125 provides excitation signals 124 to the motor 130 in a conventional manner based on control inputs from the operator. The DC power supply 123 could be as simple as a battery or a passive rectifier connected to an alternating current (AC) power source and energy storage. In another embodiment, the DC power supply 123 includes an active front end converter for converting AC power to supply the DC bus 126. It will be appreciated that while one motor drive 122 with a single inverter 125 is disclosed with respect to an embodiment, multiple drives 122 operating in a parallel fashion may also be employed. In an alternative embodiment separate motor drives 122 and/or inverter(s) 125 may be employed to control a plurality of windings, or a portion thereof of the out-runner motor 130. The motor drive, (or multiple drives) 122, may be controlled by one or more separate controllers, 120, respectively.

Continuing with FIG. 7, in an embodiment the inverter 125 has 3 phase legs, A, B, and C. Each phase leg, A, B, and C, includes switching devices 127 controlled by control signals 124 from a controller 120 in a conventional manner such as a pulse width modulation PWM scheme to convert DC power across the DC bus 126 to AC drive signals 128 to power motor 130. In an embodiment, the inverter 140 employs at least six switching devices 127 in three separate parallel legs.

In an embodiment, a sensor 138 detects an operating characteristic of the motor 130, for example, rotor positon, motor speed, torque and the like, may be measured or computed. The controller 120 (see FIG. 2) employing a pulse width modulation (PWM) function receives the operating characteristic, in this instance rotor positions from the sensors 138 and generates corresponding PWM control signals 124 to drive the gates of the switching devices 127 of the inverter 125. Drive controller 120 provides control signals 124 to the switching devices 127 of the inverter 125 to control generation of the drive signals 128 to motor 130. Controller 120 may be implemented using a general-purpose microprocessor executing a computer program stored on a storage medium to perform the operations described herein. Alternatively, drive controllers 120 may be implemented in hardware (e.g., ASIC, FPGA) or in a combination of hardware/software.

Continuing with FIG. 7, and also referring to FIG. 6, the operation electromagnetic braking methodology of the hoist system 100 and associated method of controlling the motor 130 is described. Based on the current position of the PMs 162, the stator coils 156 are excited such that it attracts the PMs 162, and thereby the rotor assembly 160. Selectively switching the excitation signals 128 thereby imparts rotation to the rotor assembly 160. Under selected conditions, for the three different positions of the rotor assembly 160 where the PMs 162 align with each of the respective Hall sensors 138 for the respective phases a braking methodology can be implemented The Hall sensors 138 labeled H2, H1, and H3 respectively detect south, north and south polarities of the rotor magnets 162 respectively. For these detected positions of rotor assembly 160, the controller 120 generates control signals 124 such that the stator coils A, C and B 156 are excited with excitation signals 128 to create south, north and south poles respectively in the stator 150 thereby attracting the rotor assembly 160 and thus electromagnetic braking is applied by the motor 130. In an embodiment, the described technique involves controlling the motor 130 as a brake under selected operational conditions, for example, under emergency conditions, or any situation when commanded by the operator. In one embodiment, if the conventional mechanical brake 190 (FIG. 2) becomes inoperative, the motor 150 is controlled to operate and act as backup for mechanical brakes 190. In another embodiment, the motor 130 is controlled to operate and provide electromagnetic braking as described above and a mechanical brakes 190 may be employed for back-up or redundancy. During motoring operation, PWM (Pulse Width Modulation) control signals 124 are applied to the switching devices 127) of the inverter 125 to generate the excitation signals 128 for the motor 130 from the input DC power on the DC bus 126. The PWM control signals 124 are generated in such a way that the electromagnetic field generated by the stator winding 156 of the motor 130 interacts with the magnetic field produced by the PMs 162 of the rotor assembly 160 to create a rotating motion. Likewise, for braking operation, the PWM control signals 124 are generated in such a way that the magnetic field generated by the stator winding 156 is configured to magnetically lock with the magnetic field of the permanent magnets in the rotor assembly 160. As a result, the motor 130 is magnetically held in a fixed positon and can hold the rotor assembly 160 of motor 130 in its current position. The stator winding 156 consists of three coils namely A, B and C which are 120° apart.

In a conventional hoist system 100 operation, to prevent the cable drum 180 and thereby the cable 182 with a load from slipping, a hold and release mechanism is performed by an electromechanical load brake 190. In the described embodiments while an electromechanical brake 190 could be employed, in an embodiment the motor drive 122 functionally performs the hold and release mechanism by controlling the PWM signals 124 and applied voltage to the motor 130 as described above. There are several methods of braking the motor 130: dynamic braking; regenerative braking; and plugging type braking. Dynamic braking is bringing the machine to rest position by dissipating the kinetic energy possessed by the motor in the form of heat energy, typically through some external resistance as a load. In regenerative braking, the motor acts as a generator. The direction of the stator current will be reversed and the power is directed back to the source, typically a battery or converter, and the like, thereby braking the motor. Plugging type braking is implemented by reversal to the power supply polarity such that the motor is driven in with the opposite polarity excitation. The reversed or opposing current will have impact on torque of the motor and, thus, produces deceleration. Moreover, during emergency conditions, braking is applied electromagnetically by controlling the PWM signals 124 to the switching devices 127. In an embodiment, the PWM signals 124 are generated based on the magnetic position of the rotor 160. The motor controller 120 generates PWM signals 124, which creates stator magnetic field opposite direction to permanent magnets thereby blocking the motor 130.

Application of the brake instantly or too rapidly is also not desirable. The impact on the hoist system 100 and users could be significant. Too rapid an application could cause the cable to slip potentially causing damage to the hoist system 100, payload being carried, or even individuals or property in the vicinity of the payload. Moreover, rapid or sudden braking would be very alarming and could be potentially harmful to a person being rescued, for example if the cable was jerked hard or stopped suddenly. To address these concerns and overcome any potential drawbacks, the braking function as provided by the motor 130 is applied gradually. For example, in an embodiment, as described herein a progressive (iterative, systematic) braking process is described.

In another embodiment another function of the hoist system 100 that may be implemented electromagnetically via the motor 130 is overload slippage. In conventional hoist systems if the load is too heavy, an overload clutch may be employed that slips to avoid damage to the hoist system 100. This slippage mechanism ensures that hoist system components are not damaged or potentially hazardous conditions are avoided by not lifting excessive loads. In an embodiment this functionality can be implemented by the hoist system 100 by the controller 120 and motor 130. During the hoist system operation, the motor's current is directly proportional to the load torque exerted on the drum 180. The motor current vs payload characteristics are pre-defined and can be stored in the controller 120. Under operational conditions, the controller monitors the current being applied to armature windings 156 of the motor 130. Under selected operating conditions, should the current exceed the stored value(s) an overload condition can be identified. In one embodiment, during such an overload conditions, the motor controller 120 stops generating or reduces the PWM signals 124 applied the switching devices 127 of the motor drive 122 which in turn eliminated or reduces the voltage applied to the motor 130. The motor 130 then stops or spins freely in order to release the load thereby functionally behaving as an over load slip clutch and making it evident to the operator that the load is excessive. In an embodiment, when an overload condition is detected by the controller 120 it is annunciated to the operator.

Figure 8:
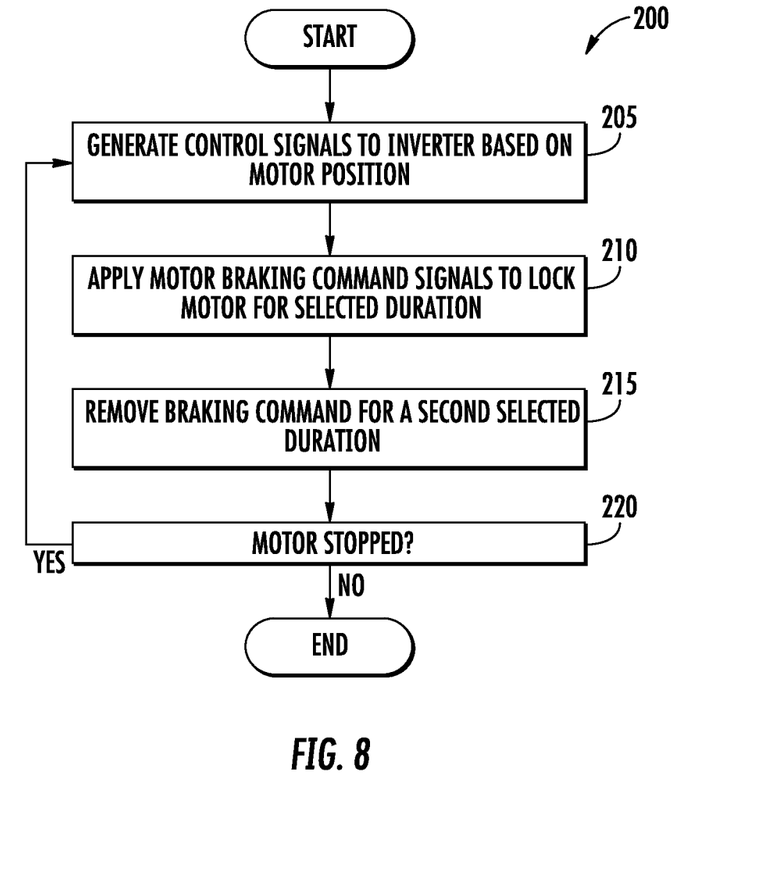
FIG. 8 depicts a flow chart detailing a method of braking the rescue hoist system in accordance with an embodiment.
Figure 9:
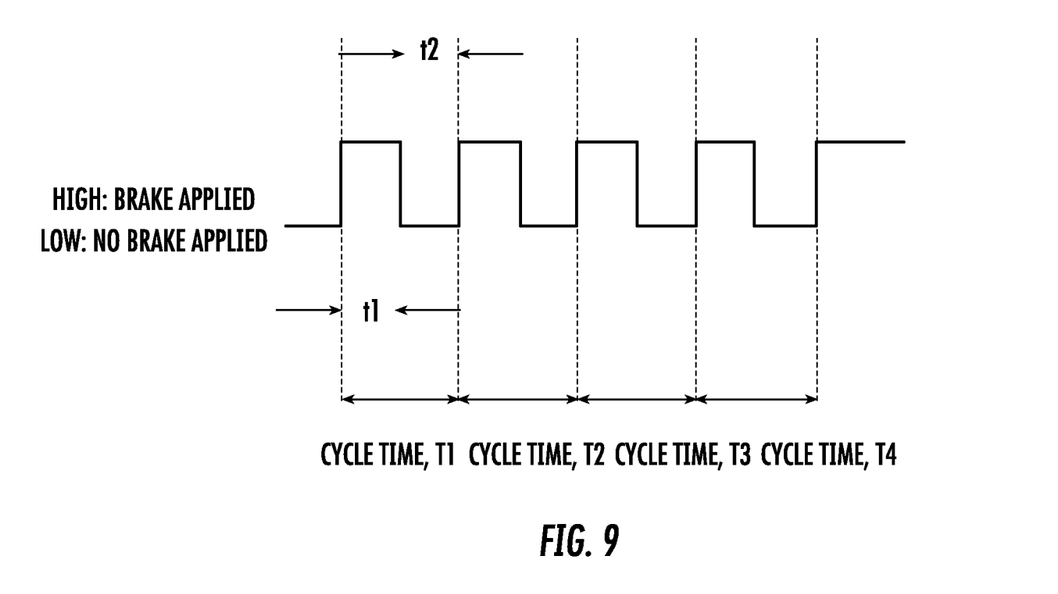
FIG. 9 depicts a timing diagram depicting the cycle time in accordance with an embodiment.

FIG. 8 depicts a method 200 employed for progressively braking with the PM motor 130 in the hoist system 100 in accordance with an embodiment. In an embodiment, there are two methods of applying the brake progressively. In the first instance, the commutation of excitation to the stator winding 156 is controlled in the direction of the motor spin to dynamically control the motor spin in a conventional fashion. In the second instance, braking is achieved by iteratively applying and removing the excitation to stator windings 156 of the motor 130 such that the braking is realized in cyclic fashion. In an embodiment, the stator coils 156 are excited as mentioned as described above for controlling the motor 130. Further, as needed, to brake the motor 130, the method herein may be employed. Turning now to FIG. 9 as well, at process step 205, an operational characteristic of the motor 130, e.g., the position of the motor rotor assembly 160, is determined based on feed back of the rotor position as sensed by the Hall Effect sensors 138. The Hall Effect sensors 138 provide signals indicative of the rotor's 160 magnetic position. From this data, the controller 120 can determine the magnetic position of the PMs 162 and thus the rotor assembly 160. The controller 120 may then generate the PWM control signals 124 to the switching devices 127 of the inverter 125. In turn, the control of the switching devices 127 generates and applies the motor command signals 128 as depicted at process step 210, to each of the stator coils 156 to induce opposing magnetic fields in the stator windings 156 such that the motor 130 becomes magnetically locked momentarily, for example a time t1. Turning now to process step 215, after waiting for a selected first duration t1, for example, a few milliseconds, the excitation is removed, permitting the rotor assembly 156 of the motor 130 to move freely due to the load for a second selected duration t2, again, on the order of milliseconds, for example. Continuing now with process step 220 the braking and non-braking of process steps 205 and 210 is repeated as needed until the motor comes to a gradual smooth stop. For example between 3-5 times such that the motor comes to a gradual stop. The control signals 124 generated by the controller 120 and the signals 128 to excite the stator coils 156 (A, B and C) i.e., t1, t2, and number of cycles as depicted in FIG. 9 are programmable in controller 120. Moreover, it will be appreciated that the command signals 128 are configurable whether in hardware or software of controller 120 for a given hoist system 100 configuration, motor 130 or motor structure.

It will be appreciated that in the described embodiments present a unique hoist system by mounting cable drum directly on the rotating motor housing with planetary gears for driveline architecture. An out-runner motor with rotating housing outside and stationary armature coils inside facilitates a simple coaxial design integral with a hoist drum. Use of PMSM reduces torque ripple, and thereby provides smoother cable paying out operations. Dual planetary gear arrangement with fixed carrier with integrated sun gear on the motor housing and the ring on the inner periphery of the cable drum provides high efficiency and tightly integrated packaging. Alternatively, the motor can be coupled directly to the cable drum without any gear arrangement using a high torque motor. Electromagnetic braking eliminates or simplifies the requirements for braking. The controller provides electromagnetic load braking and implements overload slip clutch functionality.

It will be appreciated that in the described embodiments, the control power required to power the processor of controller 120 and other electronic components may be provided by a different source that that employed for driving the motor or other equipment. For example, in an embodiment of an aircraft application, an aircraft essential bus supplies the control power to the hoist system 100 to ensure that the hoist system 100 is powered and available. Thus, even when the motor drive is not available, the control power will ensure that the switching devices 127 of the inverter 125 are operated in such a way that it creates a closed path and dissipates energy in the motor stator windings 156 to provide braking. Effectively, control power to the hoist system 100, and at least the braking portion of it is always ensured through the aircraft essential bus. Hence there is no interruption/safety issue even if input power to the motor is lost during operation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A permanent magnet motor driven hoist system comprising:
    a cable drum with a cable wrapped thereon;
    a power source;
    a permanent magnet out-runner motor comprising:
        a ferromagnetic stator on a fixed central shaft, the stator having a plurality of stator coils
        an outer rotor assembly coaxial with and disposed to rotate about the stator, the rotor assembly having a rotating housing with an outer surface radially outward of the fixed central shaft and an inner surface radially inward toward the fixed central shaft and a plurality of permanent magnets disposed at the inner surface configured to magnetically couple with the ferromagnetic stator, the rotating housing operably coupled to the cable drum such that rotation of the rotor assembly causes rotation of the cable drum to reel in/out the cable;
        wherein excitation signals applied to the plurality of stator coils induce a torque in the outer rotor assembly to cause the outer rotor assembly to rotate about the stator and central shaft, and
    a controller operably connected to the power source and the out-runner motor, the controller configured to generate the excitation signals applied to the plurality of stator coils, wherein the controller is configured to apply a braking command signals to the permanent magnet out-runner motor to magnetically lock the permanent magnet out-runner motor such that a magnetic field generated by the plurality stator windings locks with a magnetic field of the plurality of permanent magnets and holds the outer rotor assembly in a current position to hold the permanent magnet out-runner motor in a fixed position for a selected duration.

2. The hoist system of claim 1, wherein the rotating housing is at least one of directly mounted to, disposed on, integral with, and is the same as the cable drum.

3. The hoist system of claim 1, further including a first gear train operably coupled between the permanent magnet motor rotor assembly and the cable drum.

4. The hoist system of claim 3, wherein the first gear train is a planetary gear train with a sun gear operably coupled between the rotating housing and a ring gear operably coupled to the cable drum.

5. The hoist system of claim 4, wherein the sun gear is at least one of directly mounted to, disposed on, integral with, and the same as the rotating housing and the ring gear directly mounted to, disposed on, integral with, and the same as the cable drum.

6. The hoist system of claim 4, wherein the planetary gear train includes at least two planet gears interconnected by a fixed carrier.

7. The hoist system of claim 3, further including a second gear train operably coupled between the permanent magnet motor rotor assembly and the cable drum.

8. The hoist system of claim 7, wherein the first gear train and the second gear train are axially symmetric with respect to a load applied at an axial center of the cable drum.

9. The hoist system of claim 1, wherein the permanent magnet out-runner motor is at least one of a brushless direct current motor, a permanent magnet synchronous motor, and a reluctance motor.

10. The hoist system of claim 1, wherein the stator assembly includes a plurality of stator teeth, and the stator coils are at least one of concentric on a single tooth and distributed about a plurality of stator teeth.

11. The hoist system of claim 1, wherein the stator is formed of at least one of steel laminations, sintered magnetic powder material, and solid ferromagnetic material.

12. The hoist system of claim 1, wherein the permanent magnets are of arcuate in shape and axial cross section and rectangular in radial cross section, having longer sides radially outward and proximate to the rotating housing.

13. The hoist system of claim 1, wherein the permanent magnets are composed of at least one of alnico, neodymium, samarium cobalt and ceramic.

14. The hoist system of claim 1, wherein the rotating housing is ferromagnetic.

15. The hoist system of claim 1, further including a plurality of Hall effect sensors configured to detect the position of a rotor of the permanent magnet out-runner motor.

16. The hoist system of claim 1, wherein the controller includes an inverter for generating the excitation signals to the permanent magnet out-runner motor, the inverter having at least six switching devices arranged in three legs.

17. The hoist system of claim 1, wherein the excitation signals are pulse width modulated (PWM) based on an operational characteristic of the permanent magnet out-runner motor.

18. The hoist system of claim 1, wherein the controller is configured to control the permanent magnet out-runner motor employing a method to brake the permanent magnet out-runner motor comprising;
    generating control signals in the controller based on a position of the permanent magnet out-runner motor,
    applying a braking command signal to the permanent magnet out-runner motor to magnetically lock the permanent magnet rotor of the permanent magnet out-runner motor for a selected duration,
    removing the braking command signals for a second selected duration, and
    repeating the generating control signals, applying a braking command signal and removing the braking command signal until the permanent magnet out-runner motor has stopped.

19. The hoist system of claim 18, wherein the braking command signals are configurable for a given hoist configuration.

20. The hoist system of claim 1, further including an electromechanical brake operably coupled to the controller and the cable drum.

21. A method of controlling a permanent magnet out runner motor operably connected to a cable drum with a cable wrapped thereon, a controller operably connected the permanent magnet out-runner motor and a power source, the controller executing the method comprising:
    generating control signals in the controller based on a position of the permanent magnet out-runner motor;
    applying a braking command such that a magnetic field generated by the stator winding locks with a magnetic field of the permanent magnets and holds the rotor assembly in a current position to hold the permanent magnet out-runner motor in a fixed position to the permanent magnet out-runner motor to magnetically lock the permanent magnet out runner motor for a selected duration;
    removing the braking command signals for a second selected duration; and
    repeating the generating, applying and removing until the permanent magnet out-runner motor has stopped.

22. The method of claim 21, further including energizing an electromechanical brake when the permanent magnet out-runner motor is not commanded to move by the controller, wherein the electromechanical brake is configured to arrest the motion of the cable drum and hold the cable drum in a fixed position under selected conditions.

23. The method of claim 21, further including energizing an electromechanical brake when the PM out-runner motor is commanded to move by the controller, wherein the electromechanical brake is configured to arrest the motion of the cable drum and hold the cable drum in a fixed position under selected conditions.

24. The method of claim 21, wherein the braking command signals are pulse width modulated (PWM) based on an operational characteristic of the PM out-runner motor.

25. The method of claim 21, wherein the braking command signals are configurable for a given hoist configuration.

* * * * *